United States Patent [19]

Sakamoto et al.

[11] 4,069,568
[45] Jan. 24, 1978

[54] ROTARY RASPING SURFACE SCARIFYING ATTACHMENT WITH TILTING BASE

[75] Inventors: Minoru Sakamoto; Tokuichi Nagato, both of Honolulu, Hawaii

[73] Assignee: Shuichi Sakamoto, Honolulu, Hawaii ; a part interest

[21] Appl. No.: 740,719

[22] Filed: Nov. 10, 1976

[51] Int. Cl.² .................. B23D 71/00; B24B 23/00; B27C 1/00; B27C 1/10
[52] U.S. Cl. .................................... 29/78; 29/76 R; 144/115; 145/4.2; 51/170 T
[58] Field of Search .............. 29/76, 78; 145/4.2; 144/115, 118; 30/370, 166; 51/170 R, 170 T, 170 PT

[56] References Cited

U.S. PATENT DOCUMENTS

| | | | |
|---|---|---|---|
| 1,643,882 | 9/1927 | Faiver | 145/4.2 |
| 1,703,179 | 2/1929 | Skolnik | 145/4.2 X |
| 2,201,420 | 5/1940 | Zschau | 51/170 T |
| 2,252,160 | 8/1941 | Blood | 51/170 T |
| 2,395,158 | 2/1946 | Yandell | 145/4.2 |
| 3,256,648 | 6/1966 | Subonvich | 51/170 R |
| 3,601,874 | 8/1971 | Sakamoto | 29/76 |
| 3,812,626 | 5/1974 | Thompson | 51/170 PT |
| 3,824,745 | 7/1974 | Huchins | 51/170 T |

*Primary Examiner*—Harrison L. Hinson
*Attorney, Agent, or Firm*—Clarence A. O'Brien; Harvey B. Jacobson

[57] ABSTRACT

An attachment for a rotary rasping surface scarifying tool has a base member affixable on a rotary scraping tool and provided with a recess receiving a rotary blade of the tool in such a manner that the teeth of the blade are partially covered and partially exposed when the base member is resting on a surface of the base member which is substantially parallel to the rotary plane of the blade. A sloped surface of the base member causes a portion of the teeth of the blade to be exposed and permits the tool to be tilted so as to bring the rotating blade into engagement with a surface to be worked, while a guard is pivotally mounted on the base member in such a manner as to cover the exposed portion of the blade whenever the base member is resting on the level, inoperative position of the attachment.

3 Claims, 4 Drawing Figures

ROTARY RASPING SURFACE SCARIFYING ATTACHMENT WITH TILTING BASE

BACKGROUND OF THE INVENTION

1. Field of the Invention

This invention relates generally to attachments for rotary scraping tools, and particularly to an attachment for a rotary rasping surface scarifying tool.

2. Description of the Prior Art

It is known to employ rotary power tools for roughening a selected surface on appropriate lumber, and the like, to achieve a predetermined finish, and for scarifying painted and paper walls in preparation for whatever purposes desired. In particular, it is known to employ portable circular electric power saws to achieve such roughening and scarifying.

Our U.S. Pat. No. 3,601,874, issued Aug. 31, 1971, discloses a rotary rasping surface scarifying attachment in the form of a guard which receives all but the teeth of a rotary rasping blade and forms in addition to a guard member a gauge which abuts a surface being worked and regulates the depth of cut of the rotating rasping blade teeth.

U.S. Pat. No. 3,731,338, issued May 8, 1973 to V. T. Walsh, et al, discloses a mechanical paint scraper wherein the bit of the scraper moves axially relative to an associated bell-shaped housing in order to permit selective engagement of the bit with a surface on which the housing is resting. Further, U.S. Pat. No. 2,721,502, issued Oct. 25, 1955 to H. M. Adams, and U.S. Pat. No. 3,028,152, issued Apr. 3, 1962 to A. L. Scholl, et al, disclose rotary scraping and resurfacing tools wherein the housing is canted with respect to a rotary blade so that the blade makes only intermittent contact with the associated surface being worked. U.S. Pat. No. 3,165,813, issued Jan. 19, 1965 to R. Harvell, et al, discloses a rotary file wherein the teeth of the file are disposed on a beveled or sloping surface of the file so that tilting of the file will cause engagement of the teeth with the surface being worked.

SUMMARY OF THE INVENTION

It is an object of the present invention to provide a rotary rasping surface scarifying attachment which can remain resting on a work surface while the rasping blade is rotating without the blade contacting the work surface.

It is another object of the present invention to provide a rotary rasping surface scarifying attachment which permits only intermittent contact of the rasping blade with an associated work surface.

These and other objects are achieved according to the present invention by providing a rotary rasping surface scarifying attachment having: a base member affixable on a rotary scraping tool and being provided with a recess receiving a blade of the tool, the base member partially covering the blade and partially exposing the blade relative to an associated surface being worked.

More specifically, the base member is a planar element provided with a pair of substantially parallel faces. The recess is formed in one of the faces, and the one of the faces is also sloped toward the other of the faces at one peripheral portion of the base member so that the one of the faces forms a level surface parallel to the other face and the sloped portion forms a sloped surface, with the rotary blade being exposed, or extending outwardly of the base member, only at the sloped surface.

The attachment advantageously further includes a guard pivotally mounted on the base member for selectively covering the blade where same is partially exposed by the sloped surface of the base member. Suitable stops are preferably provided on the guard for limiting movement of the guard relative to the base member.

By the terms "covered" and "exposed" is meant that when the base member abuts a surface to be worked, the rasping blade will either be spaced from or in contact with the work surface, respectively.

These together with other objects and advantages which will become subsequently apparent reside in the details of construction and operation as more fully hereinafter described and claimed, references being had to the accompanying drawings forming a part hereof, wherein like numerals refer to like parts throughout.

DESCRIPTION OF THE PREFERRED EMBODIMENTS

Figure 1:
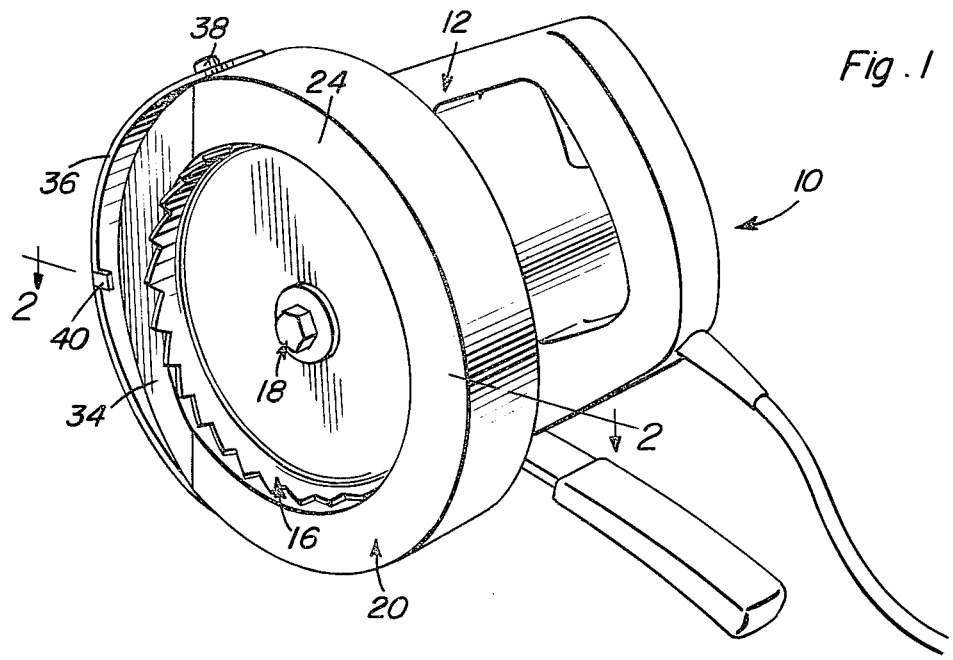
FIG. 1 is a perspective view showing a rotary rasping and surface scarifying device provided with an attachment according to the present invention.

Referring now more particularly to the figures of the drawing, a rotary rasping and surface scarifying tool 10 is shown which includes a motor unit 12 provided with a longitudinally extending shaft 14. Mounted on shaft 14 is a rotary rasping blade 16 secured as by a bolt 18 engaging in a threaded bore provided in the end portion of shaft 14. This much of tool 10 is of a conventional nature, and is disclosed in greater detail in our U.S. Pat. No. 3,601,874, issued Aug. 31, 1971. Affixed on motor unit 12 is a base member 20 which receives and partially covers the rasping blade 16. A portion of the periphery of rasping blade 16 is exposed, or extends outwardly of, the work surface abutting surfaces of the base member 20 in order to permit selective engagement of blade 16 with an associated work surface S.

Base member 20 has a circular periphery, and is provided with a pair of faces 22 and 24 arranged in planes parallel to one another over a one peripheral portion of the base member. A recess 26 is formed in the face 24, while in the bottom of the recess, adjacent face 22, is provided a hole 28 arranged for receiving shaft 14. A plurality of apertures 30 are also provided in the bottom of recess 26, so as to extend through to face 22, in which apertures 30 are received screws 32 engaging in threaded bores suitably provided in motor unit 12.

Face 24 is sloped toward face 22 at another peripheral portion of base member 20, such that face 24 in the portion thereof substantially parallel to face 22 forms a level surface, or a surface which will place face 22 parallel to an associated work surface S, while the sloped portion of face 24 forms a sloped surface 34. It is because of the sloped surface 34 that the blade 16 is exposed to work surface S at a portion of the base member 20.

The attachment further includes a guard 36 pivotally mounted on base member 20 for selectively covering the blade 16, including the associated teeth, where same is partially exposed by base member 20 to the work surface S. That is, the curved member forming guard 36 is pivotally mounted as by a pair of pins 38 so as to extend around the periphery of base member 20 where same is sloped to form the surface 34. Guard 36 includes a stop member in the form of a tab 40 arranged for engaging sloped surface 34 when the latter is flush with the work surface S and limiting movement of guard 36 relative to base member 20. Guard 36 also includes a further stop member in the form of a lip 42 extending perpendicularly from guard 36 at the uppermost surface thereof so as to be substantially parallel to tab 40. The purpose of lip 42 is to prevent guard 36 from swinging downwardly beneath the base member 20 when the tool 10 is lifted away from the work surface S.

Figure 2:
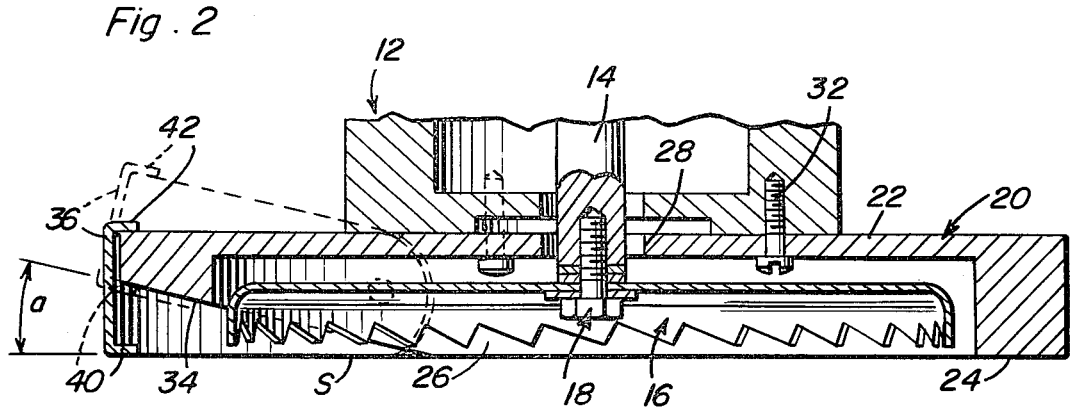
FIG. 2 is an enlarged, fragmentary, sectional view taken generally along the line 2—2 of FIG. 1.
Figure 3:
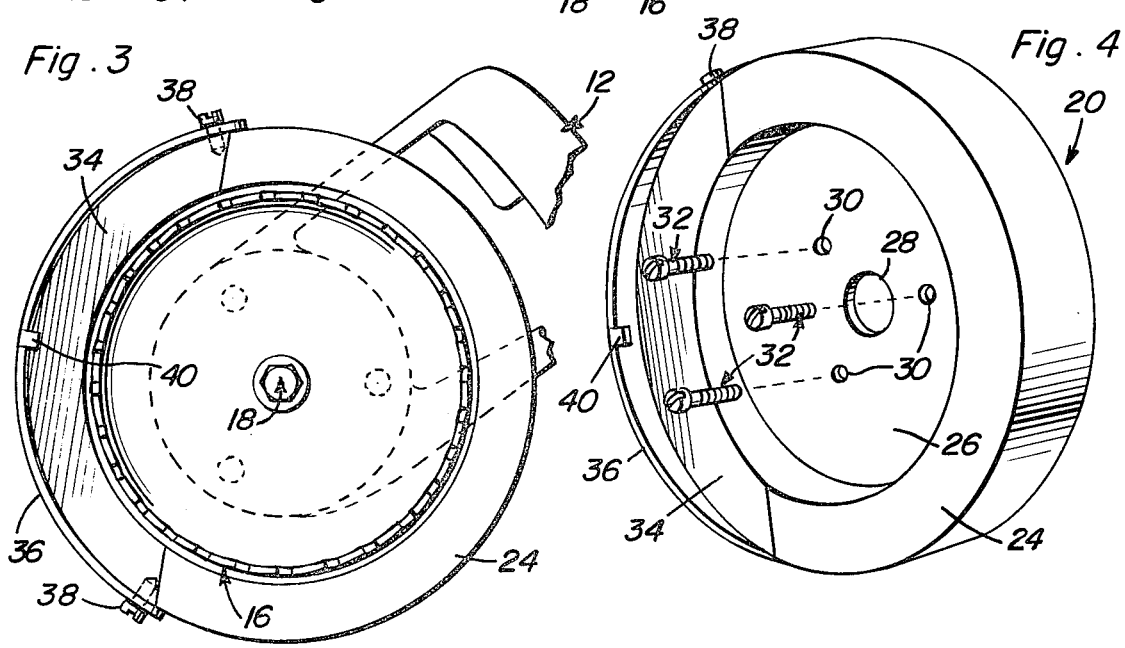
FIG. 3 is an enlarged, fragmentary, bottom plan view showing the arrangement of FIG. 1.
Figure 4:
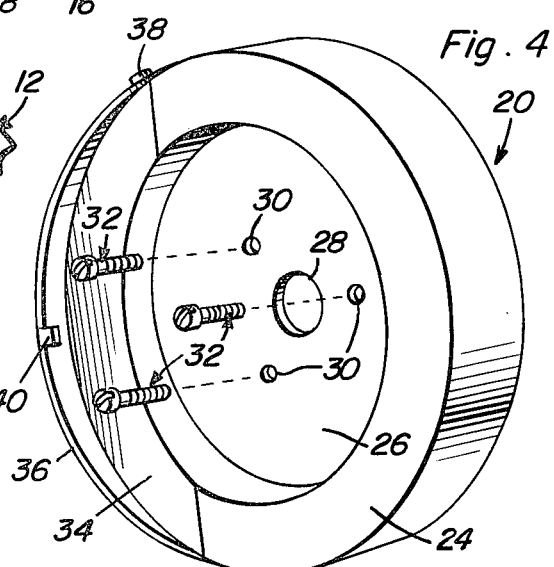
FIG. 4 is an exploded, perspective view showing a rotary rasping surface scarifying tool attachment according to the present invention.

In operation, the attachment according to the invention permits tool 10 to be left resting with the surface defined by face 24 abutting a surface S as shown in FIG. 2 of the drawing, since the teeth of the blade are received in the recess 22 of, or are covered by, the base member 20. In this position blade 16 is prevented from engagement with the surface S. When an operator (not shown) manually manipulates the motor unit 12 as by the handles thereof so as to tilt the tool 10 such that surface 34 will be resting on surface S, the circumferential portion of blade 16 instantaneously positioned with teeth exposed within the area defined by the sloped surface 34 will engage the work surface S in order to perform roughing and scarifying operations thereon. Guard 36 will have been pivoted from the full line to the broken line position shown in FIG. 2 by pressure of the work surface S against the guard 36.

As can be understood from the above description and from the drawing, a rotary rasping surface scarifying attachment according to the present invention permits a scarifying tool to be tilted from a position wherein the base member contacts a work surface but the blade is disengaged from the surface into a position where a portion of a rotating blade is brought into contact with the work surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An attachment for a rotary cutting tool, comprising a base member having a periphery and affixable on a rotary cutting tool and having a recess receiving a blade of the tool, the recess of the base member forming means for receiving some of a plurality of teeth of the blade and exposing the remainder of the teeth of the blade to an associated work surface, the base member being provided with a pair of faces arranged in planes parallel to one another over a one peripheral portion of the base member, the recess being formed in one of the faces, and the one of the faces being sloped toward the other of the faces at another peripheral portion of the base member, the one of the faces forming a level surface at the one peripheral portion and the sloped portion forming a sloped surface, with the rotary blade being exposed only at the sloped surface, the attachment further including a guard pivotally mounted on the base member for free swinging movement relative to the base member and selectively covering the blade where same is partially exposed to a work surface by the sloped surface of the base member.

2. An attachment for a rotary cutting tool, comprising a base member having a periphery and affixable on a rotary cutting tool and having a recess receiving a blade of the tool, the recess of the base member forming means for receiving some of a plurality of teeth of the blade and exposing the remainder of the teeth of the blade to an associated work surface, the base member being provided with a pair of faces arranged in planes parallel to one another over one peripheral portion of the base member, the recess being formed in one of the faces, and the one of the faces being sloped toward the other of the faces at another peripheral portion of the base member, the one of the faces forming a level surface at the one peripheral portion and the sloped portion forming a sloped surface at the another peripheral portion, with the rotary blade being exposed only at the sloped surface, the attachment further including a guard pivotally mounted on the base member for selectively covering the blade peripherally of the base member where the blade is partially exposed to a work surface by the sloped surface of the base member, the guard including a stop member arranged for engaging the sloped surface of the base member and limiting movement of the guard, tilting of the base member from the level surface to the sloped surface pivoting the guard until the stop member engages the sloped surface for exposing the rotary blade to the associated work surface.

3. A structure defined in claim 2, wherein periphery of the base member is circular.

* * * * *